Dec. 3, 1963 L. H. KUSHNER 3,112,886
COLOR CONTROL
Filed Feb. 1, 1960

INVENTOR.
LEONARD H. KUSHNER
BY
Edd D. O'Brien
ATTORNEY

3,112,886
COLOR CONTROL
Leonard H. Kushner, 618 Cambridge Drive,
Burbank, Calif.
Filed Feb. 1, 1960, Ser. No. 5,899
13 Claims. (Cl. 240—1.1)

This invention pertains to the field of illumination. More specifically it relates to the control of the color of illumination produced by a conventional light source such as a common fluorescent light bulb or the like.

It is well established that both light and color are closely related. Frequently the color of an object is defined in terms of the object's capacity to modify the color of light which is incident upon it. It is well known that the color of various objects has a definite psychological significance. Color not only creates various moods in the sense that it provides warmness or coolness or other attributes, but it affects the visual efficiency of persons.

In a number of fields it is extremely desirable to control the color of artificial illumination so that such illumination very closely resembles the illumination from the sun under standard conditions. Usually the standard illumination of the sun for comparative purposes is taken as being the illumination from the northern heavens on an overcast day in June. This standard has been adopted since the illumination from the sun will vary a great deal from one place to another in accordance with a number of factors such as the condition of the sky, the number of atmospheric pollutants persent, the season of the year and the like.

In order to artificially produce a color matching condition which matches the illumination from the sun under such standard conditions a number of different expedients have been adopted. In the past these expedients have primarily been concerned with blending various light emitting substances or with blending various primary colors of light. The first of these types of procedures can be illustrated by referring to common types of fluorescent lamps. Such fluorescent lamps convert ultra violet radiation concentrated at about the wavelength of 2537° A. to visible radiation through the use of phosphors. No one phosphor is known to produce visible illumination corresponding to illumination from the sun. Hence, it has been conventional to blend or use several different phosphors in a single fluorescent lamp. This type of expedient has a number of different practical and theoretical limitations. It is sufficient to state that a fixture manufacturer cannot purchase a light source such as a fluorescent tube capable of giving off illumination which is color corrected to standard sun illumination as indicated in the preceding.

The other type of expedient noted above involving the mixing of primary colors of light also has a number of limitations and disadvantages. It is well established that when the primary colors of light—red, green and blue—are mixed together white light is produced. Various comparatively expensive and complicated types of color matching skylights have been produced based upon this principle using various types of light sources. Apparatus of this type is comparatively expensive and costly to operate. Further, it is comparatively bulky as a result of these factors. Economically such apparatus can be used only where it is extremely critical to have correct color matching conditions, and cannot be employed economically in common stores and the like where color corrected illumination is desired for the aid of the average purchaser.

An object of the present invention is to provide new and improved methods and apparatus for the control of color in order to obtain light corresponding to sunlight under standard conditions using a conventional light source or in order to obtain light from such a source for other purposes such as creating effects of psychological significance. A related general object is to provide an apparatus for the purposes indicated which may be easily and conveniently constructed at a comparatively nominal cost, and which can be used with the same ease as conventional lighting fixtures. Another object of the present invention is to provide a method as indicated which enables the basic principles of this invention to be applied in a number of different ways for use in creating a number of different effects.

In accordance with this invention these general objectives are accomplished through the use of colorants which provide a coating. The term "colorant" is conventionally used to designate substances which produce surface colors in objects. The primary colors of colorants are commonly considered as red, yellow, and blue. Thus, the primary colors of colorants differ from the primary colors of light as indicated in the preceding discussion. It is well known that by mixing red and yellow pigments an orange colorant is produced; in similar manner red and blue pigments produce purple-violet, and yellow and blue pigments produce green. Mixing all three of these primary colorants produces black.

This invention is, to a large extent, predicated on the discovery that if a mixture of discrete particles of colorants or discrete particles covered with colorants, this mixture containing colorants representing colors throughout the visible spectrum, are used so as to provide a surface which receives light energy prior to such energy being utilized that color correction is achieved. This is surprising since in accordance with the classical theory of colorants as indicated above, it would be expected that various shades of black, purple, green or orange would result from such a mixture, particularly if it was viewed from a distance at which the eye would be incapable of determining the discrete character of the particles of colorants.

The manner in which this discovery is utilized is best more fully explained by referring directly to the accompanying drawing in which.

It is to be understood that the accompanying drawing is intended primarily for explanatory purposes only. It will be realized from a consideration of the remainder of this description that the features or principles of this invention can be used in an extremely wide variety of different ways in lighting fixtures or installations in which light from a light source, such as a fluorescent tube or an incandescent bulb, is directed upon a reflective surface constructed in accordance with this invention prior to such illumination reaching an area where it is employed for the intended purpose.

Figure 1:
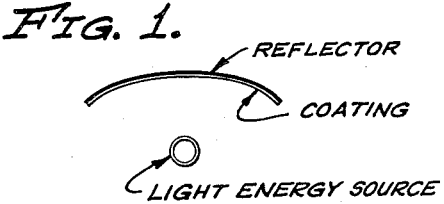
FIG. 1 shows, in diagrammatic form, a color corrected fixture created in accordance with this invention.

In FIG. 1 there is shown a lighting fixture formed in accordance with this invention. This fixture is of a conventional direct, luminaire type and utilizes an elongated, conventional light source which is located with respect to a parabolic reflector so that about fifty percent of the illumination from this lamp is directed toward this reflector. With the present invention the surface of this reflector adjacent to the lamp is completely covered with a coating consisting of a mixture of discrete, differently colored particles. A conventional, substantially colorless binder, such as a common white paint, a colorless adhesive or the like is used so as to hold these particles in position. A number of differents results can be achieved with the present invention depending upon the mixture of colored particles used in this coating.

In obtaining illumination from the fixture shown when using a standard warm white fluorescent lamp as a source of light energy in this lamp which is "color corrected" in that it corresponds very closely to the illumination from the sun taken from the north on a cloudy day in June, it is preferred to form this coating with a mixture of small glass beads, each being about 1.75 mm. in diameter and each having substantially the same density, proportioned substantially as follows:

| | Percent by weight |
|---|---|
| Royal blue (corresponding to ultra marine blue, given as #9 on the Hiler Color Harmony Chart) | 8 |
| Silver (corresponding to the color of conventional aluminum metal) | 8 |
| Green (corresponding to green given as #13 on Hiler Color Harmony Chart) | 28 |
| Gold (corresponding to golden yellow given as #2 on Hiler Color Harmony Chart) | 22 |
| Red (corresponding to scarlet given as #4 on the Hiler Color Harmony Chart) | 34 |

The term "Hiler Color Harmony Chart" used in the preceding refers to the standard color reference work by this name published by Hiler Color Charts of San Francisco, California, In using a mixture as indicated above the beads are applied to the reflector in a layer of single bead thickness so that the beads are located as closely adjacent to one another as conveniently possible. Further, these beads are held in place utilizing a transparent plastic adhesive binder which does not cover the beads themselves, but which bonds to the surfaces of them adjacent to the reflector and which bonds to this reflector.

The forenoted mixture of colored beads is efficient in obtaining color correction illumination only when the lamp or light source utilized with it is of a type commonly referred to as a standard warm white fluorescent lamp. Lamps of this type, or which have substantially the same spectral energy distribution curves as this lamp, are stocked items which are available from normal lamp supply sources. It will be realized, however, that the spectral energy distribution curves of such lamps will vary with a number of factors, and are not constant in character. As an example of this fluorescent lamps will give off a different illumination when they are new than when they are old. Because of such factors, a mixture as proposed above will not give what may be termed "absolute" color correction at all times under the circumstances, but it will give color correction of the illumination of lamps for the major portion of the normal life of any lamp.

Figure 4:
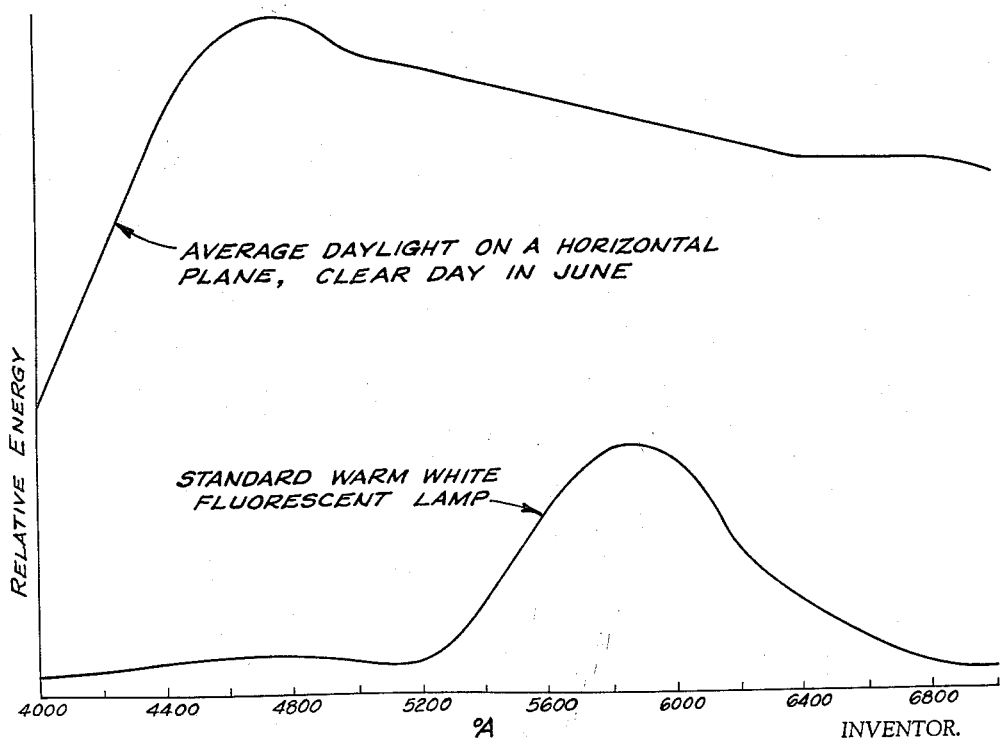
FIG. 4 is a series of graphs showing spectural curves which are useful in explaining the use of this invention.

The nature of the mixture of discrete color particles specified above is considered to be quite important to an understanding of the present invention. As shown in FIG. 4 of the drawing the spectra energy distribution of a standard warm white fluorescent lamp is of such a nature that the relative energy of a lamp of this type is comparatively low throughout the violet-blue and part of the green regions of the spectrum and increased toward the yellow region of the spectra to a peak located about midway to the yellow and orange regions of the spectrum, and then decreases gradually so that such a lamp is deficient in red illumination. Such standard warm white fluorescent lamps are commonly considered to give off illumination which is relatively rich in blue green colors. The spectral energy distribution curve of standard sunlight, as discussed in the preceding description, and as indicated in FIG. 4, is relatively constant throughout the visible regions of the spectrum, although such sunlight is comparatively deficient in relative energy at the violet and red ends of the visible spectrum based on a quantity of comparison of spectrum color width.

In obtaining color corrected illumination from a fixture as indicated in FIG. 1 a reflective surface is utilized which is relatively rich in discrete particles which are colored so as to correspond to the radiation region of the spectrum. Thus, the coating used accentuates this region in the spectrum as far as the total illumination from the fixture is concerned. It does not, however, neglect the other regions of the spectrum; it contains a distribution of colors from all regions of the spectrum. Such use of colors which are representative of all regions of the spectrum is considered necessary in order to obtain illumination having the desired color correction qualities corresponding to the illumination from the sun as indicated in the preceding discussion.

In the mixture of colored beads used in forming a preferred coating as indicated above, the beads having silver color are considered to serve an efficiency increasing function. Apparently these beads not only "pick up" the light reflected by the various differently colored beads in this coating in such a manner as to help cause illumination which is a mixture of colors, but also to act so as to reflect a predetermined proportion of light energy which is incident upon a reflector without any color change.

A fixture such as is shown in FIG. 1 using a standard warm white fluorescent lamp can be modified in a number of different ways in order to achieve psychological effects or in order to improve the efficiency of the illumination obtained from it for other purposes. As an example of this it is possible to create a "warm" feeling of light by covering the reflector in this fixture by the following mixture of beads as described in the preceding:

| | Percent by weight |
|---|---|
| Royal blue | 2 |
| Silver | 13 |
| Green | 14 |
| Gold | 42 |
| Red | 29 |

It is similarly possible to create a "mood excitement" feeling which makes an individual feel uncomfortable by creating a mixture of these same beads proportioned substantially as follows so that it accentuates the orange-red region of the spectrum:

| | Percent by weight |
|---|---|
| Royal blue | 3 |
| Silver | 7 |
| Green | 10 |
| Gold | 34 |
| Red | 46 |

Also if desired, a depressing cold type of illumination may be achieved by forming a mixture as follows using these same beads in which the blue region of the spectra is accentuated:

| | Percent by weight |
|---|---|
| Royal blue | 33 |
| Silver | 28 |
| Green | 18 |
| Gold | 9 |
| Red | 12 |

Similar mixtures to these described in the preceding can be prepared for use in achieving the same or similar effects with other types of standard fluorescent lamps, or with incandescent lamps of various types in the manner indicated in FIG. 1 by varying the proportion of the discrete colored particles utilized by calculation and the use of routine experimentation. All of the effects or results indicated can also be achieved by using variously colored plastic beads or particles. Such beads may be formed using known dyes together with various known resins such as transparent acrylic polymers, polystyrene and the like. In all of these cases the coating used must contain colors representing regions throughout the visible spectrum, and must contain a greater amount of such colors from regions of the spectrum in which the illumination from the light source utilized is deficient in illumination as compared to a standard sunlight if color correction is to be achieved, or must contain a greater amount of such color of a type desired to produce various effects if those results are to be achieved, than the amount of color in other regions of the spectrum in each of these cases.

Obviously it is impractical in this specification to set forth every conceivable formula which may be used with every conceivable type of lamp and every conceivable type of reflector. The nature of the mixture used in a direct lighting fixture as shown in FIG. 1 will, of course, vary depending upon the amount of light from the light source which is incident upon the reflector employed. In all cases, however, preferred results are achieved along with uniform illumination from a color sense when a reflector is utilized which is designed and constructed as the reflector shown in FIG. 1 so that the direct illumination obtained is co-incident with the reflected illumination obtained, and in which these two types of illumination are substantially uniformly distributed over the same area.

Figure 2:
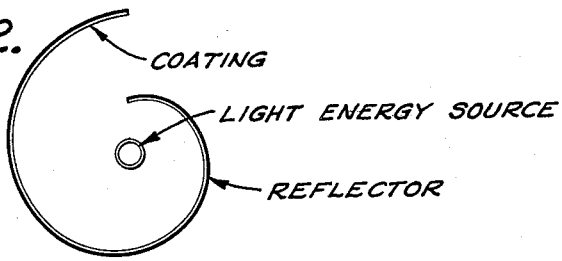
FIG. 2 shows, in diagrammatic form, a modified color corrected fixture constructed in accordance with this invention.

The basic features of this invention can be employed in a number of different ways; as an example of this in FIG. 2 there is shown a lighting fixture formed in accordance with this invention utilizing an elongated so-called "paracyl" reflector within which there is disposed a common conventional light energy source such as a fluorescent lamp as shown or an incandescent lamp. With this type of reflector all of the illuminataion from this lamp is reflected off of the reflector prior to its being directed where it is utilized. The reflector in the lamp shown in FIG. 2 may be provided with a coating consisting of a mixture of small glass or plastic beads of a type indicated in the preceding discussion proportioned so as to give a color correction or various color effects as described. The precise mixtures of such beads utilized will, of course, depend upon the effects to be achieved. A suitable mixture for any purpose may be derived by calculation and through the use of routine experimentation as indicated above with a minimum of difficulty. It is, however, possible to coat the interior of the reflector shown in FIG. 2 with a coating as indicated in the drawing consisting of a plurality of separate pieces or particles, each of which is about one-sixteenth inch square, and about 0.030 inch thick, these reflecting pieces being covered with pigments and being proportioned as to colors as indicated in the preceding discussion. Particularly suitable results are considered to be achieved when these pieces are pieces of colored anodized aluminum.

Figure 3:
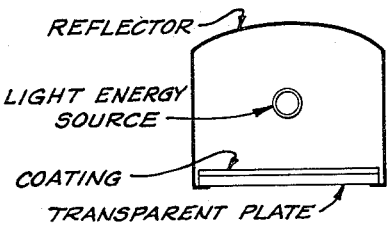
FIG. 3 shows, in diagrammatic form, a further modified color corrected fixture constructed in accordance with this invention.

In FIG. 3 of the drawing there is shown a still further modified lighting fixture of this invention which includes a light energy source located within a reflector which is designed so that all of the illumination from this light energy source goes through a transparent plate held by this reflector. This plate holds a coating of transparent small glass or plastic beads proportioned as to give color correction or modificataion as discussed in the preceding discussion. The proportion of such particles required for any type of color correction or modification in this type of fixture can be easily determined on the basis of this specification by calculation and a small amount of routine experimentation. If desired, the plate shown in FIG. 3 may be shaped as a lens; regardless of how it is shaped it may be formed out of glass, transparent plastic, such as known acrylic polymers or the like. If desired, a light polarizing coating (not shown) may also be located on the plate employed. In this type of fixture either an incandescent or a fluorescent lamp may be employed.

The basic principles of this invention can be applied in a number of different ways. Thus, they can be utilized in an installation in which illumination from a standard light source of a fluorescent or incandescent variety is projected upon an external surface such as a wall or upon a ceiling or an internal wall provided with a reflective coating as herein described. In virtually any application of this invention the essential advantages of it are achieved at a comparatively nominal or low cost. Thus, this invention is considered to bring within an economic range color corrected illumination as needed in stores and the like where the average purchaser may be encouraged to purchase an article under color lighting conditions more closely corresponding to the illumination of the sun. The principles of this invention may also be applied to various types of public places where psychological and/or physiological effects caused by colors are desired for various purposes.

One major advantage to this invention lies in the fact that it may be applied economically in a number of different ways. As an example of this the results of this invention can be easily achieved with various known, commonly used types of lighting fixtures by simply coating the reflectors employed in such fixtures, with a multicolored mixture of discrete particles as described herein. Such a coating may be created upon the normally exposed surface of a pressure sensitive adhesive tape which can be pressed in place directly upon a reflector.

The effectiveness of this invention is not completely understood from a theoretical standpoint. Indeed, the whole subject matter of light and color is not considered to be completely understood at the present time. This is especially the case with reference to the manner in which the human being sees different colors. It is, however, believed that the effectiveness of this invention is in some way related to the fact that the various discrete particles used in accordance with this disclosure, and in particular with glass or plastic particles or beads as specified herein may act as a type of prism in the structures set forth. It is to be emphasized that this is set forth by way of theory only and is not to be considered as limiting this invention.

Because of the nature of this invention and the fact that it has a great many ramifications and can be applied in many different ways, it is to be considered as being limited only by the appended claims forming a part of this disclosure.

I claim:

1. A lighting fixture which comprises: a reflector; a warm white fluorescent lamp located adjacent to said reflector so that about fifty percent of the illumination from said lamp is directed toward said reflector, and a coating located on the surface of said reflector adjacent to said lamp, said coating including a mixture of small glass beads covering the surface of said reflector adjacent to said lamp, said beads being proportioned so that about eight percent of said beads are of a royal blue color, eight percent of said beads are of a silver color, about twenty-eight percent of said beads are of a green color, about twenty-two percent of said beads are of a gold color and about thirty-four percent of said beads are of a red color.

2. A lighting fixture which comprises: a reflector; a warm white fluorescent lamp located adjacent to said reflector so that abouty fifty percent of the illumination from said lamp is directed toward said reflector, and a coating located on the surface of said reflector adjacent to said lamp, said coating including a mixture of small glass beads covering the surface of said reflector adjacent to said lamp, said beads being proportioned so that about two percent of said beads are of a royal blue color, thirteen percent of said beads are of a silver color, about fourteen percent of said beads are of a green color, about forty-two percent of said beads are of a gold color and about twenty-nine percent of said beads are of a red color.

3. A lighting fixture which comprises: a reflector; a warm white fluorescent lamp located adjacent to said reflector so that about fifty percent of the illumination from said lamp is directed toward said reflector, and a coating located on the surface of said reflector adjacent to said lamp, said coating including a mixture of small glass beads covering the surface of said reflector adjacent to said lamp, said beads being proportioned so that about three percent of said beads are of a royal blue color, seven percent of said beads are of a silver color, about ten percent of said beads are of a green color, about thirty-four percent of said beads are of a gold color and about forty-six percent of said beads are of a red color.

4. A lighting fixture which includes: a reflector; a transparent plate held by said reflector; and a source of light energy located within said reflector so that substantially all illumination from said light energy source within said fixture goes through said transparent plate; and a mixture of colored transparent glass beads located in a random manner on said plate so as to cover said plate, some of said beads being colored to represent the violet and blue regions of the visible spectrum, some of said beads being colored to represent the green region of the visible spectrum, some of said beads being colored to represent the yellow-orange regions of the visible spectrum and some of said beads being colored to represent the red region of the visible spectrum, said mixture of beads containing a greater proportion of beads representing some of the regions of the spectrum than beads colored to represent other regions of the visible spectrum.

5. A lighting fixture which includes: a reflector having a reflective surface, a light energy source located so as to direct light energy toward said reflective surface, and a reflective coating located upon said reflective surface, said coating including a mixture of discrete colored glass beads located in a random manner on said reflective surface, at least some of said beads being colored a color representing each of the regions of a visible spectrum.

6. A lighting fixture as defined in claim 5 wherein said reflector is located adjacent to said light energy source so that part of the light energy from said source is reflected by said reflector over the same area which receives light energy directly from said light energy source.

7. A lighting fixture as defined in claim 5 wherein all of the light energy from said light energy source is directed toward said reflector.

8. A lighting fixture which includes: a reflector having a reflective surface, a light energy source located so as to direct light energy toward said reflective surface, and a reflective coating located upon said reflective surface, said coating including a mixture of discrete transparent bodies, said bodies being colored, said bodies being located in a random manner on said reflective surface, at least some of said bodies being colored a color representing each of the visible regions of the spectrum, at least some of said bodies being silver in color.

9. A lighting fixture as defined in claim 8 wherein said reflector is located adjacent to said light energy source so that part of the light energy from said source is reflected by said reflector over the same area which receives light energy directly from said light energy source.

10. A lighting fixture as defined in claim 8 wherein all of the light energy from said light energy source is directed toward said reflector.

11. A lighting fixture which includes: a reflective surface; a fluorescent light energy source located so as to direct light energy toward said reflective surface; and a reflective coating located upon said surface, said coating including a mixture of discrete colored glass beads located adjacent to one another in a random manner on said surface, some of said beads being colored to represent the blue and violet regions of the visible spectrum, some of said beads colored to represent the green region of the visible spectrum, some of said beads colored to represent the yellow-orange region of the visible spectrum and some of said beads being colored to represent the red region of the visible spectrum, said mixture of beads containing a greater proportion of beads representing some of the regions of the spectrum than beads colored to represent other regions of the visible spectrum.

12. A lighting fixture as defined in claim 11 wherein said reflector is located adjacent to said light energy source so that part of the light energy from said source is reflected by said reflector over the same area which receives light energy directly from said light source.

13. A lighting fixture as defined in claim 11 wherein all of the light energy from said light energy source is directed toward said reflector.

References Cited in the file of this patent

UNITED STATES PATENTS

| 1,090,785 | Ives | Mar. 17, 1914 |
| 1,319,186 | Spencer | Oct. 21, 1919 |
| 1,391,585 | Sheringham | Sept. 20, 1921 |
| 1,519,448 | Gamain | Dec. 16, 1924 |
| 1,877,512 | Hurley | Sept. 13, 1932 |
| 2,387,038 | Owens | Oct. 16, 1945 |
| 2,721,256 | Duhon | Oct. 18, 1955 |
| 2,831,966 | Porteous | Apr. 22, 1958 |
| 2,836,707 | Stitt | May 27, 1958 |
| 2,933,595 | Tabouret | Apr. 19, 1960 |

FOREIGN PATENTS

| 1,119,795 | France | Apr. 9, 1956 |